(12) United States Patent  
Xiangli et al.

(10) Patent No.: US 10,095,377 B2
(45) Date of Patent: Oct. 9, 2018

(54) METHOD AND DEVICE FOR DISPLAYING ICON BADGE

(71) Applicant: Xiaomi Inc., Beijing (CN)

(72) Inventors: Fei Xiangli, Beijing (CN); Zhuang Qian, Beijing (CN); Baoke Chen, Beijing (CN)

(73) Assignee: Xiaomi Inc., Beijing (CN)

( * ) Notice: Subject to any disclaimer, the term of this patent is extended or adjusted under 35 U.S.C. 154(b) by 93 days.

(21) Appl. No.: 15/181,600

(22) Filed: Jun. 14, 2016

(65) Prior Publication Data

US 2017/0024109 A1    Jan. 26, 2017

(30) Foreign Application Priority Data

Jul. 24, 2015   (CN) .......................... 2015 1 0441327

(51) Int. Cl.
- G09G 5/02      (2006.01)
- G06F 3/0481    (2013.01)
- G06T 11/00     (2006.01)
- G06T 11/60     (2006.01)
- G06T 7/90      (2017.01)

(52) U.S. Cl.
CPC ............ G06F 3/04817 (2013.01); G06T 7/90 (2017.01); G06T 11/001 (2013.01); G06T 11/60 (2013.01); *G06T 2207/20216* (2013.01)

(58) Field of Classification Search
None
See application file for complete search history.

(56) References Cited

U.S. PATENT DOCUMENTS

| | | | |
|---|---|---|---|
| 8,251,823 B2 | 8/2012 | Kando et al. | |
| 2008/0139310 A1 | 6/2008 | Kando et al. | |
| 2009/0265666 A1 | 10/2009 | Hsieh et al. | |
| 2009/0305732 A1 | 12/2009 | Marcellino et al. | |
| 2009/0307622 A1 | 12/2009 | Jalon et al. | |
| 2013/0151963 A1 | 6/2013 | Costenaro et al. | |
| 2013/0194447 A1 | 8/2013 | Sudo et al. | |
| 2015/0186399 A1 | 7/2015 | Jalon et al. | |
| 2015/0228249 A1* | 8/2015 | Lee .......................... | G09G 5/02 345/593 |

(Continued)

FOREIGN PATENT DOCUMENTS

| | | |
|---|---|---|
| CN | 102929545 A | 2/2013 |
| CN | 103472975 A | 12/2013 |

(Continued)

OTHER PUBLICATIONS

International Search Report of PCT/CN2015/099725, mailed from the State Intellectual Property Office of China dated Apr. 18, 2016.

(Continued)

*Primary Examiner* — Xiao Wu
*Assistant Examiner* — Mohammad H Akhavannik
(74) *Attorney, Agent, or Firm* — Finnegan, Henderson, Farabow, Garrett & Dunner LLP

(57) ABSTRACT

A method for displaying a badge of an icon is disclosed. The method may comprise acquiring feature information of the icon; determining a display element of the badge according to the acquired feature information; and generating and displaying the badge according to the determined display element, at a preset position of the icon.

14 Claims, 11 Drawing Sheets

(56) References Cited

U.S. PATENT DOCUMENTS

2016/0117849 A1    4/2016  Qian et al.
2017/0010794 A1*  1/2017  Cho .................... G06F 3/04817

FOREIGN PATENT DOCUMENTS

| CN | 104238875 A | 12/2014 |
|----|-------------|---------|
| CN | 104461236 A | 3/2015 |
| CN | 104461243 A | 3/2015 |
| CN | 104615331 A | 5/2015 |
| CN | 104718528 A | 6/2015 |
| CN | 104965639 A | 10/2015 |
| CN | 105159661 A | 12/2015 |
| JP | 2008-142181 A | 6/2008 |
| JP | 2010-091617 A | 4/2010 |
| JP | 2011-232913 A | 11/2011 |
| JP | 2013-257692 A | 12/2013 |
| JP | 2013-257784 A | 12/2013 |
| KR | 10-2014-0034354 A | 3/2014 |
| RU | 2549520 C2 | 4/2015 |

OTHER PUBLICATIONS

Extended European Search Report issued in Application No. 16175764.6, mailed from the European Patent Office, dated Jan. 2, 2017.
Office Action issued in Russian Application No. 2016111102/08(017487), mailed from the Patent Office of the Russian Federation, dated Mar. 24, 2017.

* cited by examiner

METHOD AND DEVICE FOR DISPLAYING ICON BADGE

CROSS-REFERENCE TO RELATED APPLICATIONS

This application is based upon and claims priority to Chinese Patent Application No. 201510441327.7, filed Jul. 24, 2015, the entire contents of which are incorporated herein by reference.

TECHNICAL FIELD

The present disclosure relates to the technical field of icon display and, more particularly, to a method and a device for displaying a badge of an icon.

BACKGROUND

In smart phones, when an application receives a message, a badge may appear on the upper right corner of the application's icon, for example, as a superscript number. The badge may serve to notify a user of the received message.

In current Android or iOS system, badge colors and patterns may be consistent for all applications. For instance, the badge color and pattern in the iOS system include a white number in a red background encircled by a white border.

SUMMARY

One aspect of the present disclosure is directed to a method for displaying a badge of an icon. The method may comprise acquiring feature information of the icon; determining a display element of the badge according to the acquired feature information; and generating and displaying the badge according to the determined display element, at a preset position of the icon.

Another aspect of the present disclosure is directed to a device for displaying a badge of an icon. The device may comprise a processor and a memory for storing instructions executable by the processor. The processor may be configured to acquire feature information of the icon; determine a display element of the badge according to the acquired feature information; and generate and display the badge, according to the determined display element, at a preset position of the icon.

Another aspect of the present disclosure is directed to a non-transitory computer-readable storage medium having stored therein instructions that, when executed by a processor in a terminal device, cause the terminal device to perform a method for displaying a badge of an icon. The method may comprise acquiring feature information of the icon; determining a display element of the badge according to the acquired feature information; and generating and displaying the badge, according to the determined display element, at a preset position of the icon.

It is to be understood that both the foregoing general description and the following detailed description are exemplary and explanatory only and are not restrictive of the invention.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with some aspects related to the invention as recited in the appended claims.

Figure 1:
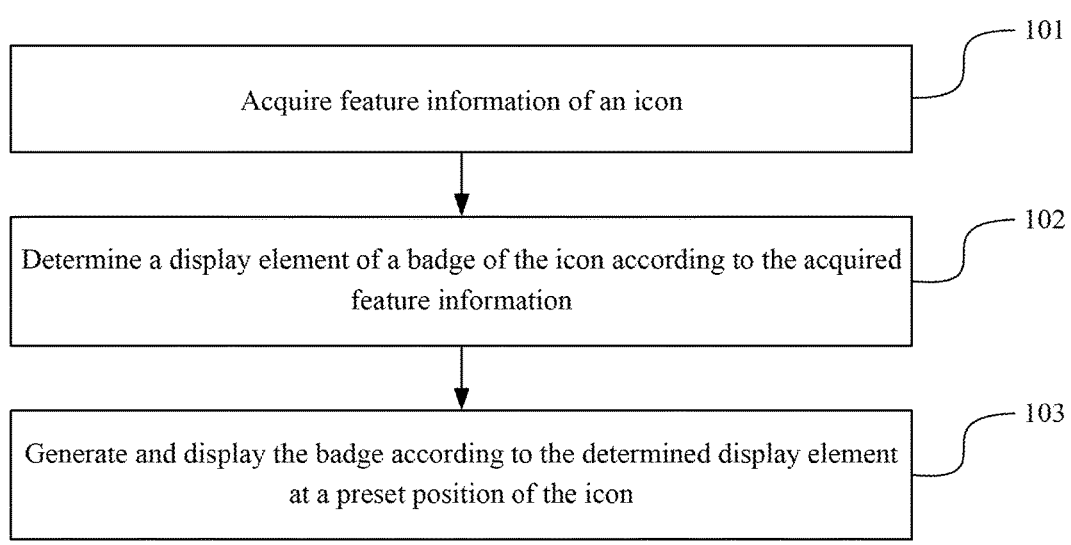
FIG. 1 is a flow chart illustrating a method for displaying a badge of an icon, according to an exemplary embodiment.

FIG. 1 is a flow chart illustrating a method 100 for displaying a badge of an icon, according to an exemplary embodiment. As shown in FIG. 1, the method 100 for displaying a badge of an icon can be implemented by a terminal device such as a mobile phone, a camera, a tablet, or an application, and may include the following steps S101-S103.

In step S101, when generating a badge of an icon, feature information of the icon is acquired. In some embodiments, icons of some applications may be on a system desktop, or saved in a folder. Therefore, the icon may be an application icon, an application folder icon, or another type of icon. Accordingly, the badge of the icon may be a badge of the application icon, a badge of the application folder icon, or a badge of another type of icon. The application icon can be a shortcut icon of the application, and when the application icon is double-clicked, the application may be started.

In step S102, a display element of the badge is determined according to the acquired feature information. The display element of the badge may include one or more of a shape of the badge, a background color of the badge, a color of a character in the badge, and a font of a character in the badge. The display element of the badge may also include one or more of a color of the badge border (a border of the badge), a width of the badge border, and a shape of the badge border.

In step S103, the badge according to the determined display element is generated and displayed at a preset position of the icon.

In one embodiment, when generating a badge of an icon, the display element of the badge can be determined according to the feature information of the icon, and the badge can be generated and displayed at the preset position of the icon according to the determined display element. Thus, the badge of the icon can be displayed in different styles for different applications, easing the visual fatigue from a flood of similar badges on the desktop.

Figure 2:
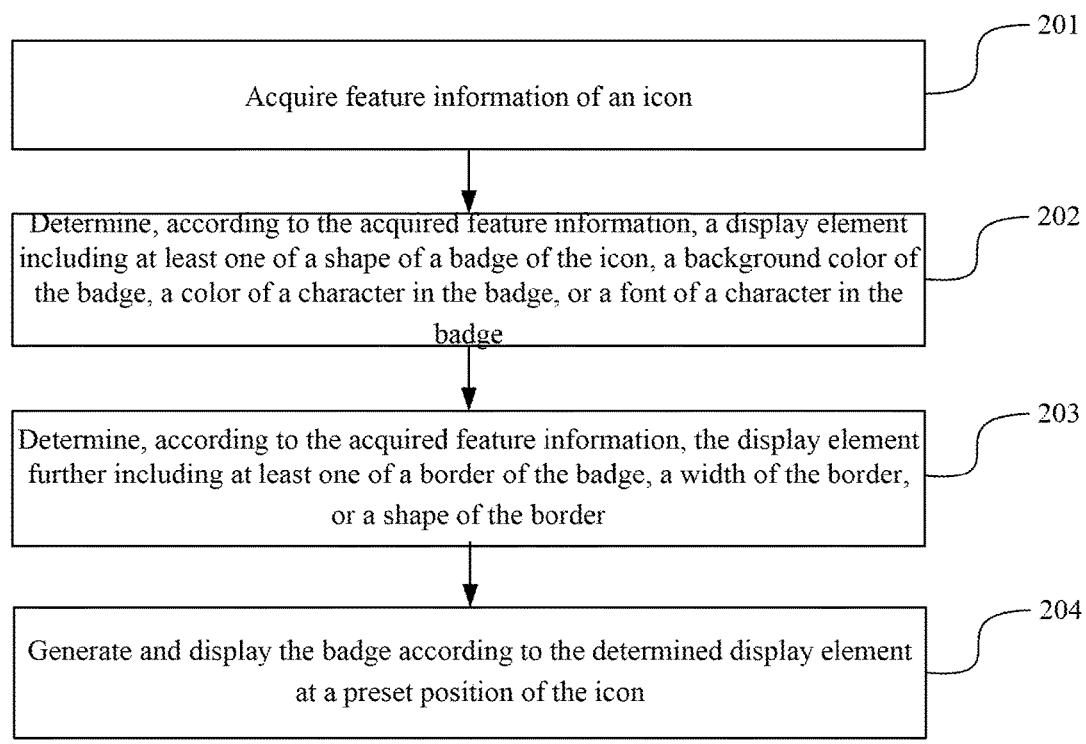
FIG. 2 is a flow chart illustrating a method for displaying a badge of an icon, according to an exemplary embodiment.

FIG. 2 is a flow chart illustrating a method 200 for displaying a badge of an icon, according to an exemplary embodiment. As shown in FIG. 2, the method 200 for displaying a badge of an icon can be implemented by a terminal device such as a mobile phone, a camera, a tablet, or an application, and may include the following steps S201-S204.

In step S201, when generating a badge of an icon, feature information of the icon is acquired. In some embodiments, icons of some applications may be on a system desktop, or saved in a folder. Therefore, the icon may be an application icon, an application folder icon, or another type of icon. Accordingly, the badge of the icon may be a badge of the application icon, a badge of the application folder icon, or a badge of another type of icon. The application icon can be a shortcut icon of the application, and when the application icon is double-clicked, the application may be started.

In step S202, a display element including at least one of a shape of the badge, a background color of the badge, a color of a character in the badge, or a font of a character in the badge is determined according to the feature information of the icon. That is, the display element of the badge may include one or more of the shape of the badge, the background color of the badge, the color of the character in the badge, and the font of the character in the badge.

In step S203, the display element further including at least one of a border of the badge, a width of the border, or a shape of the border is determined according to the feature information of the icon. That is, the display element of the badge may further include one or more of the color of the badge border, the width of the badge border, and the shape of the badge border.

In step S204, the badge according to the determined display element is generated and displayed at a preset position of the icon. The step may further include generating and displaying the badge border, e.g., generating and displaying the badge border according to the color of the badge border, the width of the badge border, and/or the shape of the badge border described above. For example, if the background color of the badge is a first color (red), in order to distinguish from the application icon, a second color (white) having a width of N pixels can be used as the badge border. Thus, the generated badge border can look more obvious.

Figure 3:
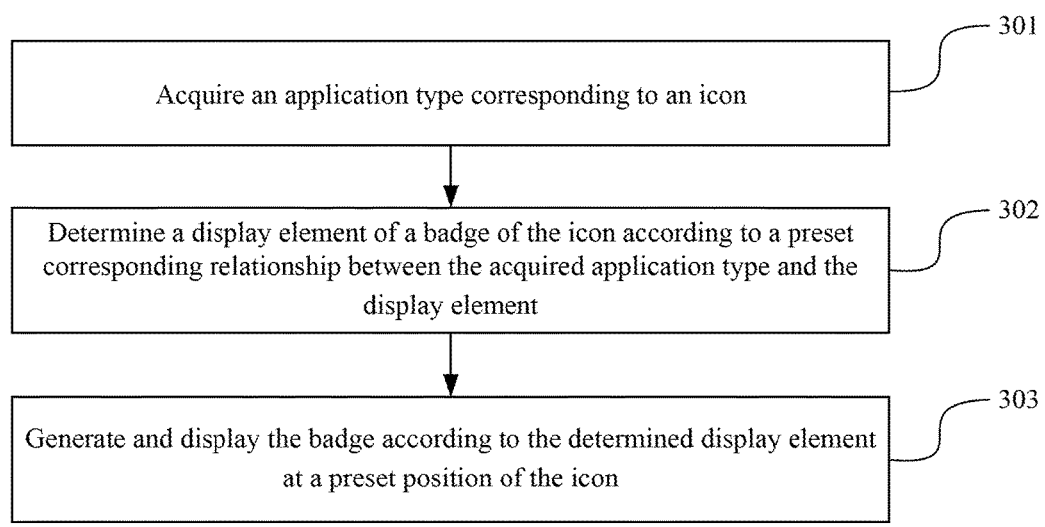
FIG. 3 is a flow chart illustrating a method for displaying a badge of an icon, according to an exemplary embodiment.

FIG. 3 is a flow chart illustrating a method 300 for displaying a badge of an icon, according to an exemplary embodiment. As shown in FIG. 3, the method 300 for displaying a badge of an icon can be implemented by a terminal device such as a mobile phone, a camera, a tablet, or an application, and may include the following steps S301-S303.

In step S301, when generating a badge of an icon, an application type corresponding to the icon is acquired. The icon may be an application icon, an application folder icon, or another type of icon. Accordingly, the badge may be a badge of the application icon, a badge of the application folder icon, or a badge of other icon.

In step S302, a display element of the badge is determined according to a preset corresponding relationship between the acquired application type and the display element. The display element of the badge may include one or more of a shape of the badge, a background color of the badge, a color of a character in the badge, and a font of a character in the badge. The display element of the badge may also include one or more of a color of the badge border, a width of the badge border, and a shape of the badge border.

In some embodiments, the step S302 may further include the following.

First, application programs or application folders can be classified in advance. For example, the applications or programs may be classified into video type, communication type, work type, or the like according to functions. The applications may also be classified according to standards such as user habits, frequencies of use, or time periods of using the application programs. Accordingly, for example, the applications may be classified into work type, leisure type, or the like. The type of the application folder may be determined according to types of the applications included in the application folder. For example, the application folders may be classified into video type, communication type, work type, or the like. Moreover, the application folders may also be classified according to standards such as user habits, frequency of use, or time periods of using the application programs in the folders. Similarly, for example, the application folders may be classified into work type, leisure type, or the like.

Second, a corresponding relationship between the various application types and the various display elements of the badge can be established. For example, when a corresponding relationship between a communication application and a display element is established, a background color of the badge corresponding to a communication application can be red, a color of a character in the corresponding badge can be black, and a font of a character in the corresponding badge can be Song typeface. If the display element of the badge corresponding to the communication application further includes one or more of a color of the badge border, a width of the badge border, and a shape of the badge border, the color can be white, the width can be three pixels, and the shape can be rectangle.

Third, a display element of the badge can thus be determined according to the preset corresponding relationship between the application type and the display element.

In step S303, a badge is generated and displayed at a preset position of the icon, according to the determined display element. For example, when the current application type is a communication type, the display element may include a background color of the badge being red, a color of a character in the badge being black, a font of a character in the badge being Song typeface, a color of the badge border being white, a width of the badge border being three pixels, and a shape of the badge border being rectangle, and the badge may be displayed according to the display element.

As described, different display styles may be used for badges of different applications according to application types, thus improving the user experience.

Figure 4:
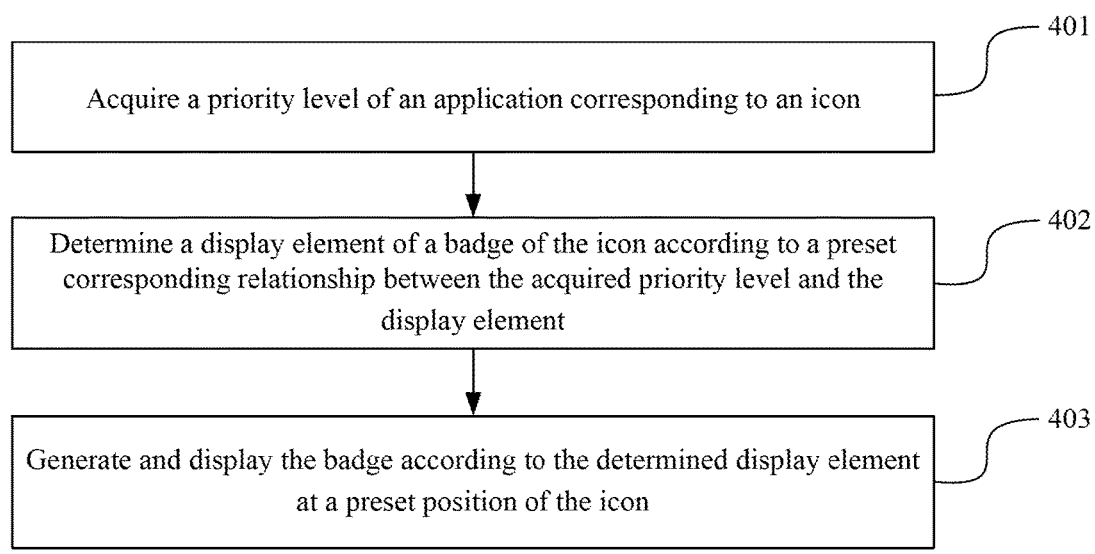
FIG. 4 is a flow chart of illustrating a method for displaying a badge of an icon, according to an exemplary embodiment.

FIG. 4 is a flow chart illustrating a method 400 for displaying a badge of an icon, according to an exemplary embodiment. As shown in FIG. 4, the method 400 for displaying a badge of an icon can be implemented by a terminal device, such as a mobile phone, a camera, a tablet, or an application, and may include the following steps S401-S403.

In step S401, when generating a badge of an icon, a priority level of an application corresponding to the icon is acquired. The icon may be an application icon, an application folder icon, or another type of icon. Accordingly, the badge of the icon may be a badge of the application icon, a badge of the application folder icon, or a badge of another type of icon.

In step S402, a display element of a badge of the icon is determined according to a preset corresponding relationship between the acquired priority level and the display element. The display element of the badge may include one or more of a shape of the badge, a background color of the badge, a color of a character in the badge, and a font of a character in the badge. The display element may also include one or more of a color of the badge border, a width of the badge border, and a shape of the badge border.

The step 402 may further include the following.

First, various priority levels of applications or application folders can be determined in advance. For example, priority levels of one or more applications most frequently used can be set to the highest according to a use habit or a use frequency.

Second, a corresponding relationship between the priority levels and different badge display styles can be established. For example, a corresponding relationship can be established between an application of the highest priority level and badge display styles including: a first color, red (which may be more distinguishing than other colors), as a background color of the badge, a second color, black, as a color of a character in the badge, a first shape, rhombus, as a shape of the badge, and a first typeface, Song typeface, as a font of a character in the badge. The step 402 may further include: setting a color of the badge border corresponding to the application having the highest priority level as grey, setting a width of the corresponding badge border as four-pixel width, and setting a shape of the corresponding badge border as rhombus.

Third, the display element of a badge of the icon can be determined according to the preset corresponding relationship.

In step S403, a badge is generated and displayed at a preset position of the icon, according to the determined display element. For example, when generating a badge of an application of the highest priority level, the first color can be used as the background color of the badge, the second color can be used as the color of a character in the badge, the first shape, e.g., rhombus, can be used as the shape of the badge, and the first typeface, e.g., Song typeface, can be used as the font of the character in the badge. The step S403 may further include: when generating the badge of the application having the highest priority level, using grey as the color of the badge border, using four-pixel width as the width of the badge border, and using rhombus as the shape of the badge border.

As described, badges having different display elements may be used for various applications according to their application priority levels.

Figure 5:
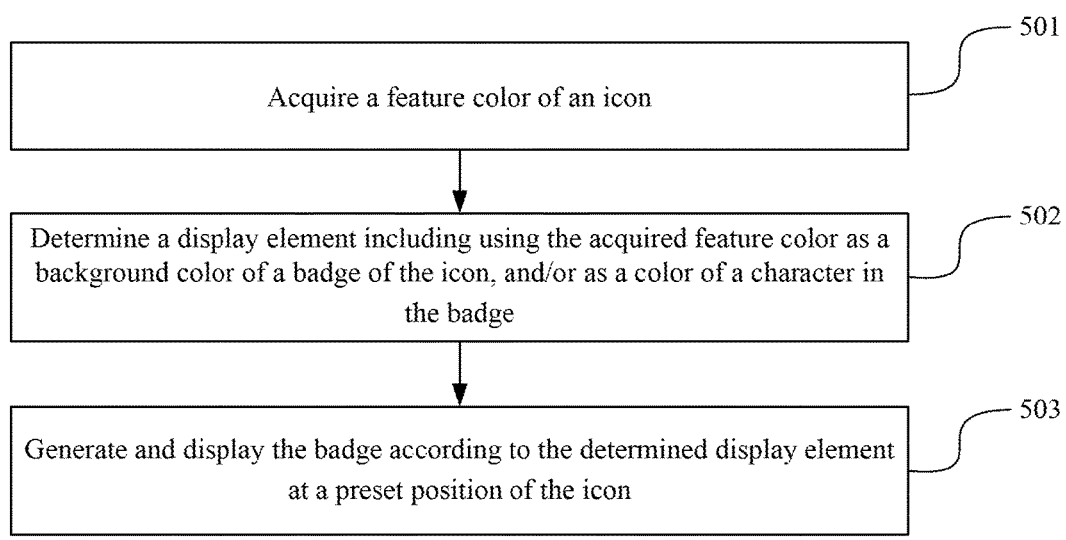
FIG. 5 is a flow chart of illustrating a method for displaying a badge of an icon, according to an exemplary embodiment.

FIG. 5 is a flow chart of a method 500 for displaying a badge of an icon, according to an exemplary embodiment. As shown in FIG. 5, the method 500 for displaying a badge of an icon may be implemented by a terminal device such as a mobile phone, a camera, a tablet, or an application, and may include the following steps S501-S503.

In step S501, when generating a badge of an icon, a feature color of the icon is acquired. In the step, the icon may be an application icon, an application folder icon, or another type of icon. Accordingly, the badge of the icon may be a badge of the application icon, a badge of the application folder icon, or a badge of another type of icon.

In step S502, the feature color is used as a background color of the badge; and/or as a color of a character in the badge. In one embodiment, the display element may include the background color of the badge and/or the color of a character in the badge. For example, a color value appearing most frequently can be used as a representative color, and the representative color can be designated as a color of a lower layer of the badge (background).

In step S503, a badge is generated and displayed at a preset position of the icon, according to the determine display element.

In one embodiment, different display styles may be employed for different application badges according to the feature colors of the application icons.

In one embodiment, the step S501 may further include:

acquiring a most frequently appearing color value among color values of all pixels of the icon, and using the acquired color value as the feature color of the icon.

In some embodiments, the icon may be an application icon, e.g., the application corresponding to the icon can be an application program. A most frequently appearing color value can be used as a representative color, and the representative color can be designated as a color of the lower layer of the badge (background), or as a color of a character in the badge.

In one embodiment, the step S501 may further include: averaging color values of pixels with similar colors in image files of the icon, and using the averaged value as the feature color of the icon.

In some embodiments, the icon can be an application icon, e.g., the application corresponding to the icon can be an application program, and the icon mainly comprises gradient colors. That is, the icon may mostly comprise similar gradient colors, with a small number of pixels having the same color, and a large number of pixels having similar colors.

Figure 6:
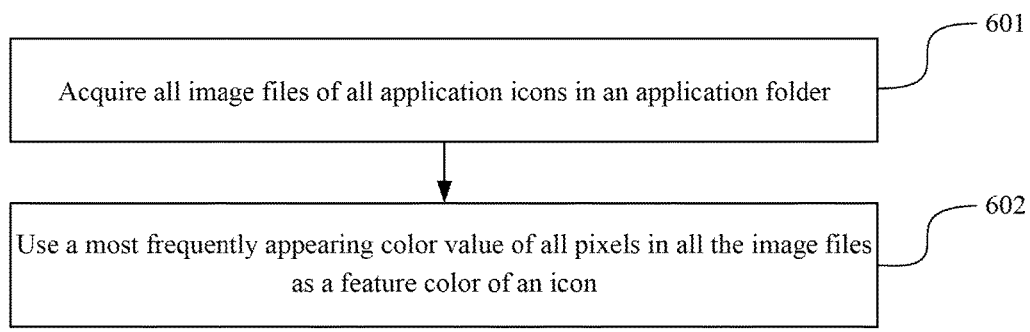
FIG. 6 is a flow chart illustrating a step in a method for displaying a badge of an icon, according to the exemplary embodiment.

In one embodiment, when an application corresponding to the icon is an application folder, as shown in FIG. 6, the step S501 may include the following steps.

In step 601, all image files of all application icons in an application folder are acquired.

In step 602, a most frequently appearing color value of all pixels in all the image files is used as a feature color of an icon.

In some embodiments, the icon can be an application folder, e.g., the application corresponding to the icon is an application folder. A most frequently appearing color value can be used as a representative color, and the representative color can be designated as a color of the lower layer of the badge (background), or as a color of a character in the badge.

Figure 7:
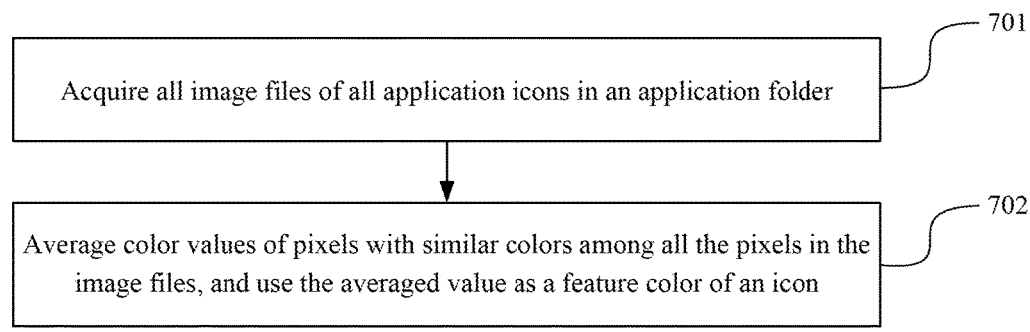
FIG. 7 is a flow chart illustrating a step in a method for displaying a badge of an icon, according to the exemplary embodiment.

In one embodiment, when an application corresponding to the icon is an application folder, as shown in FIG. 7, the step S501 may include the following steps.

In step 701, all image files of all application icons in an application folder are acquired.

In step 702, color values of pixels with similar colors among all the pixels in the image files are averaged, and the averaged value is used as a feature color of an icon.

In some embodiments, the icon can be an application folder, e.g., the application corresponding to the icon can be an application folder, and the icon mainly comprises gradient colors. That is, the icon may mostly comprise similar gradient colors, with a small number of pixels having the same color, and a large number of pixels having similar colors.

In some embodiments, a method for displaying a badge of an icon can help users to overcome visual fatigue of desktop badges. Since the color of the badge can be automatically changed according to the color of the application icon, there can be no more monotonous badges having a single color on the desktop. Instead, various badge colors in accordance with the corresponding applications can ease the visual fatigue.

If the APP (application program) icon is directly displayed on the desktop, the method may include the following steps.

In step 1, a system selects colors according to an icon of an application on the desktop. For example, the system may read an image file of an icon of an application, analyze, and obtain a most frequently appearing color value among color values of all pixels in the image file. The color value can be returned as a result of a color selection, of a representative color, from the application icon. The system may comprise a processor and a non-transitory computer-readable storage medium storing instructions that, when executed by the process, cause the system to perform step 1 and step 2.

In step 2, the system designates the selected color as a color of a lower layer of the application badge. The system may also add a white border having a three-pixel width for the badge as a badge border. That is, because a representative color of the colors of the application icon is used in the badge, a border may be added on the periphery of the badge to distinguish the badge.

The method may have the following advantageous effects.

The method can reduce visual fatigue caused by monotonous badges, and can improve notification efficiency and user experience. Moreover, the application scenario can optimize badge color systems to provide badges with different colors according to different features of the application programs.

Figure 8:
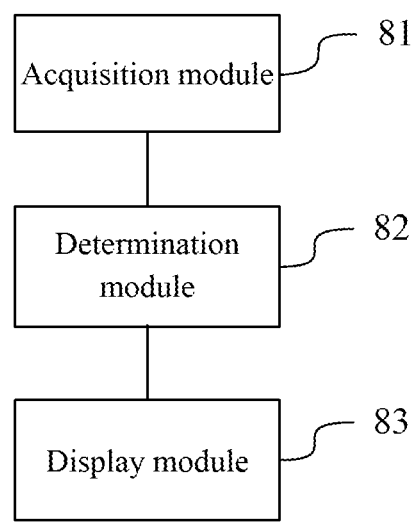
FIG. 8 is a block diagram illustrating a device for displaying a badge of an icon, according to an exemplary embodiment.

FIG. 8 is a block diagram illustrating a device 800 for displaying a badge of an icon, according to an exemplary embodiment, including: an acquisition module 81 configured to, when generating a badge of an icon, acquire feature information of the icon; a determination module 82 configured to determine a display element of the badge according to the acquired feature information of the icon; and a display module 83 configured to generate and display a badge at a preset position of the icon, according to the determined display element.

The acquisition module 81 can be configured to, when generating a badge of an icon, acquire an application type corresponding to the icon.

The determination module 82 can be configured to determine a display element corresponding to an application type according to a preset corresponding relationship between the application type and the display element.

In one embodiment, the acquisition module 81 can be configured to, when generating a badge of an icon, acquire a priority level of an application corresponding to the icon.

The determination module 82 can be configured to determine a display element corresponding to the priority level of the application according to a preset corresponding relationship between the priority level of the application and the display element.

In one embodiment, the acquisition module 81 can be configured to, when generating a badge of an icon, acquire a feature color of the icon.

The determination module 82 can be configured to use the feature color as a background color of the badge, and/or as a color of a character in the badge.

Figure 9:
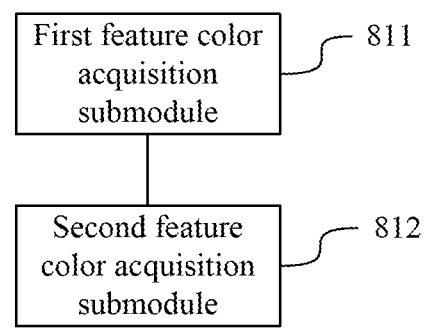
FIG. 9 is a block diagram illustrating an acquisition module in a device for displaying a badge of an icon, according to an exemplary embodiment.

In one embodiment, as shown in FIG. 9, the acquisition module 81 may include:

a first feature color acquisition submodule 811 configured to, when generating a badge of an icon, acquire a most frequently appearing color value among the color values of all pixels in an image file of the icon, and use the acquired color value as a feature color of the icon.

In one embodiment, as shown in FIG. 9, the acquisition module 81 may further include: a second feature color acquisition submodule 812 configured to, when generating a badge of an icon, average the color values of pixels with similar colors among all the pixels in the image file of the icon, and use the averaged value as the feature color of the icon.

Figure 10:
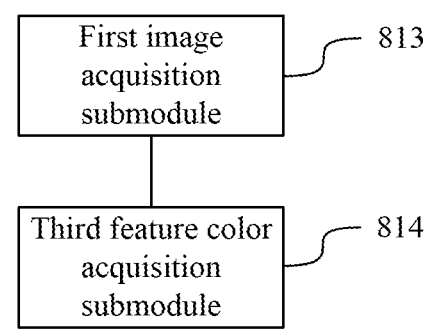
FIG. 10 is a block diagram illustrating an acquisition module in a device for displaying a badge of an icon, according to an exemplary embodiment.

In one embodiment, when an application corresponding to the icon is an application folder, as shown in FIG. 10, the acquisition module 81 includes: a first image acquisition submodule 813 configured to, when generating a badge of an icon, acquire all image files of all application icons in the application folder; and a third feature color acquisition submodule 814 configured to use a color value having a highest occurrence number among the color values of all pixels in all the image files as the feature color of the icon.

Figure 11:
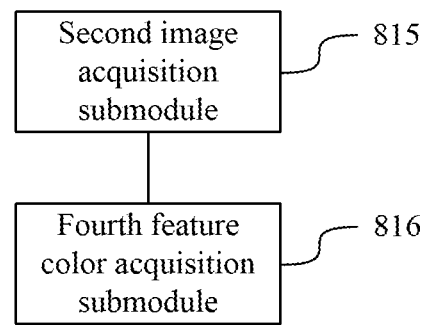
FIG. 11 is a block diagram illustrating an acquisition module in a device for displaying a badge of an icon, according to an exemplary embodiment.

In one embodiment, when an application corresponding to the icon is an application folder, as shown in FIG. 11, the acquisition module 81 includes: a second image acquisition submodule 815 configured to, when generating a badge of an icon, acquire all image files of all application icons in the application folder; and a fourth feature color acquisition submodule 816 configured to average the color values of pixels with similar colors among all the pixels in the image files, and use the averaged value as the feature color of the icon.

The determination module 82 may be configured to: determine one or more of a shape of the badge, a background color of the badge, a color of a character in the badge, and a font of a character in the badge according to the feature information of the icon.

The display module 83 may be further configured to generate and display a badge border for the badge.

Detailed operations for individual modules have been described in detail in the embodiments regarding corresponding methods.

Figure 12:
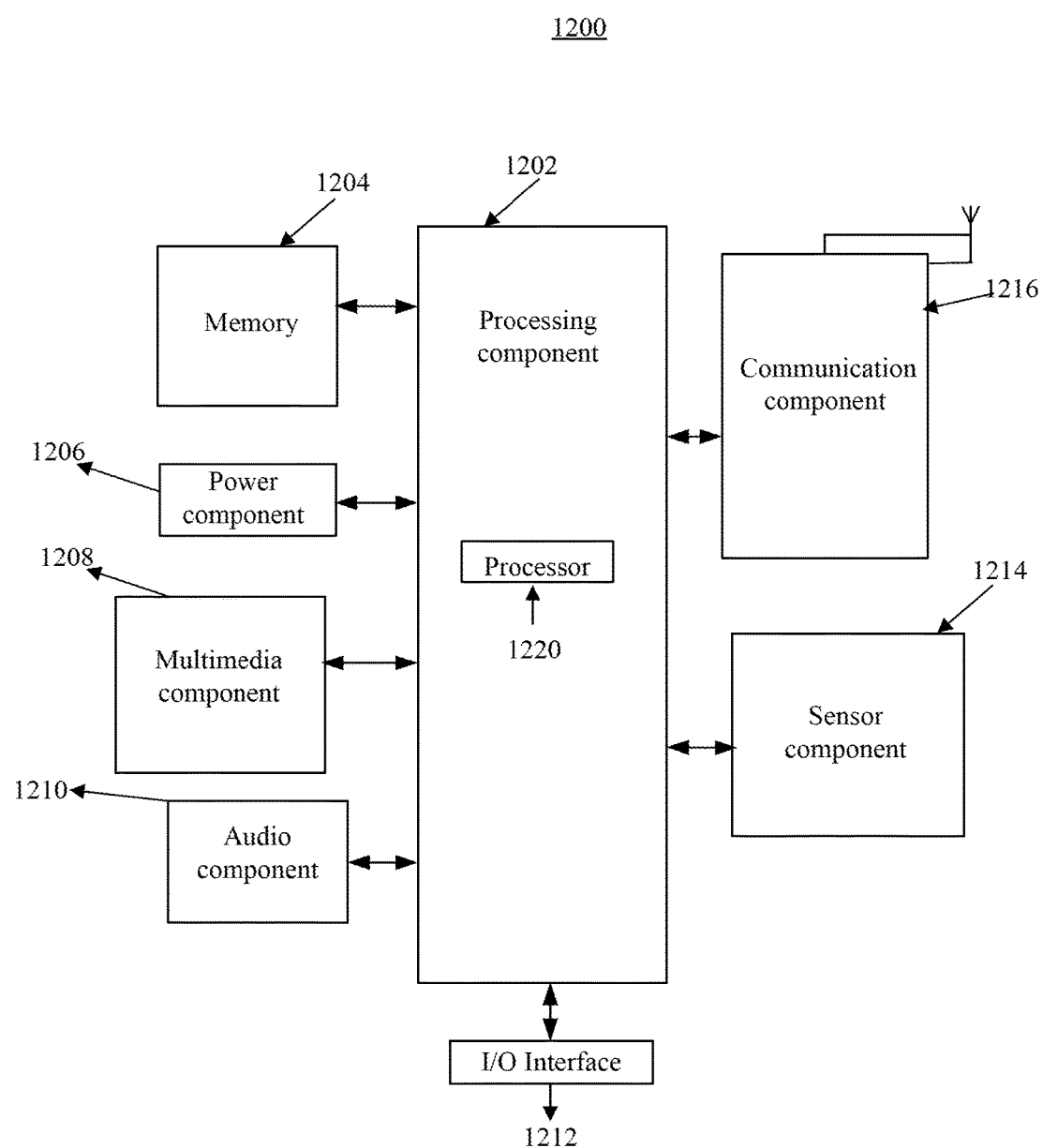
FIG. 12 is a block diagram illustrating a device applicable for displaying a badge of an application, according to an exemplary embodiment.

FIG. 12 is a block diagram of a device 1200 for displaying application badge, according to an exemplary embodiment. The device 1200 can be a terminal device. For example, the device 1200 may be a mobile phone, a computer, a digital broadcast terminal, a messaging device, a gaming console, a tablet, a medical device, exercise equipment, a personal digital assistant, and the like.

Referring to FIG. 12, the device 1200 may include one or more of the following components: a processing component 1202, a memory 1204, a power component 1206, a multimedia component 1208, an audio component 1210, an input/output (I/O) interface 1212, a sensor component 1214, and a communication component 1216.

The processing component 1202 may control overall operations of the device 1200, such as the operations associated with display, telephone calls, data communications, camera operations, and recording operations. The processing component 1202 may include one or more processors 1220 to execute instructions to perform all or part of the steps in the above described methods. Moreover, the processing component 1202 may include one or more modules which facilitate the interaction between the processing component 1202 and other components. For instance, the processing component 1202 may include a multimedia module to facilitate the interaction between the multimedia component 1208 and the processing component 1202.

The memory 1204 may be non-transitory computer-readable and configured to store various types of data to support the operation of the device 1200. Examples of such data include instructions for any applications or methods operated on the device 1200, contact data, phonebook data, messages, images, video, etc. The memory 1204 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1206 may provide power to various components of the device 1200. The power component 1206 may include a power management system, one or more power sources, and any other components associated with the generation, management, and distribution of power in the device 1200.

The multimedia component 1208 may include a screen providing an output interface between the device 1200 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1208 may include a front camera and/or a rear camera. The front camera and/or the rear camera may receive an external multimedia datum while the device 1200 is in an operation mode, such as a photographing mode or a video mode. Each of the front camera and the rear camera may be a fixed optical lens system or have focus and optical zoom capability.

The audio component 1210 may be configured to output and/or input audio signals. For example, the audio component 1210 may include a microphone ("MIC") configured to receive an external audio signal when the device 1200 is in an operation mode, such as a call mode, a recording mode, and a voice recognition mode. The received audio signal may be further stored in the memory 1204 or transmitted via the communication component 1216. In some embodiments, the audio component 1210 may further include a speaker to output audio signals.

The I/O interface 1212 may provide an interface between the processing component 1202 and peripheral interface modules, such as a keyboard, a click wheel, buttons, and the like. The buttons may include, but are not limited to, a home button, a volume button, a starting button, and a locking button.

The sensor component 1214 may include one or more sensors to provide status assessments of various aspects of the device 1200. For instance, the sensor component 1214 may detect an open/closed status of the device 1200, relative positioning of components, e.g., the display and the keypad, of the device 1200, a change in position of the device 1200 or a component of the device 1200, a presence or absence of user contact with the device 1200, an orientation or an acceleration/deceleration of the device 1200, and a change in temperature of the device 1200. The sensor component 1214 may include a proximity sensor configured to detect the presence of nearby objects without any physical contact. The sensor component 1214 may also include a light sensor, such as a CMOS or CCD image sensor, for use in imaging applications. In some embodiments, the sensor component 1214 may also include an accelerometer sensor, a gyroscope sensor, a magnetic sensor, a pressure sensor, or a temperature sensor.

The communication component 1216 may be configured to facilitate communication, wired or wirelessly, between the device 1200 and other devices. The device 1200 can access a wireless network based on a communication standard, such as WiFi, 2G, or 3G, or a combination thereof. In one exemplary embodiment, the communication component 1216 may receive a broadcast signal or broadcast associated information from an external broadcast management system via a broadcast channel. In one exemplary embodiment, the communication component 1216 may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1200 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 1204, executable by the processor 1220 in the device 1200, for performing the above-described methods. For example, the non-transitory computer-readable storage medium may be a ROM, a RAM, a CD-ROM, a magnetic tape, a floppy disc, an optical data storage device, and the like.

It should be understood by those skilled in the art that the above described modules can each be implemented through hardware, or software, or a combination of hardware and software. One of ordinary skill in the art will also understand that multiple ones of the above described modules may be combined as one module, and each of the above described modules may be further divided into a plurality of submodules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for displaying a badge of an icon, comprising:
acquiring feature information of the icon, the feature information including at least a feature color of the icon;
determining a display element of the badge according to the acquired feature information, the determining of the display element of the badge comprises:
determining at least one of a shape of the badge, a background color of the badge, a color of a character in the badge, or a font of a character in the badge according to the acquired feature information; and
generating and displaying the badge according to the determined display element, at a preset position of the icon,
wherein when an application corresponding to the icon is an application folder, acquiring the feature information of the icon comprises at least one of:
acquiring all image files of all application icons in the application folder, and using a most frequently appearing color value among color values of all pixels in all the image files as the feature color of the icon, or
acquiring all image files of all application icons in the application folder; and averaging color values of pixels with similar colors among all pixels in the image files, and using the averaged value as the feature color of the icon.

2. The method according to claim 1, wherein:
acquiring the feature information of the icon comprises acquiring an application type corresponding to the icon; and
determining the display element of the badge according to the acquired feature information comprises determining the display element corresponding to the acquired application type according to a preset corresponding relationship between the acquired application type and the display element.

3. The method according to claim 1, wherein:
acquiring the feature information of the icon comprises acquiring a priority level of an application corresponding to the icon; and
determining the display element of the badge according to the acquired feature information comprises determining the display element corresponding to the acquired priority level of the application according to a preset corresponding relationship between the acquired priority level of the application and the display element.

4. The method according to claim 1, wherein:
determining the display element of the badge according to the acquired feature information comprises using the feature color as the background color of the badge, and/or as the color of the character in the badge.

5. The method according to claim 1, wherein acquiring the feature color of the icon comprises at least one of:
acquiring a most frequently appearing color value among color values of all pixels in an image file of the icon, and using the acquired color value as the feature color of the icon; or
averaging color values of pixels with similar colors among all pixels in an image file of the icon, and using the averaged value as the feature color of the icon.

6. The method according to claim 1, wherein generating and displaying the badge, according to the determined display element, at the preset position of the icon comprises:
generating and displaying a badge border for the badge.

7. The method according to claim 6, wherein determining the display element of the badge according to the acquired feature information further comprises:
determining at least one of a color of the badge border, a width of the badge border, or a shape of the badge border according to the acquired feature information.

8. A device for displaying a badge of an icon, comprising:
a processor; and
a memory for storing instructions executable by the processor;
wherein the processor is configured to:
acquire feature information of the icon, the feature information including at least a feature color of the icon;
determine a display element of the badge according to the acquired feature information; and
generate and display the badge, according to the determined display element, at a preset position of the icon, and
wherein in determining the display element of the badge according to the acquired feature information, the processor is further configured to:
determine at least one of a shape of the badge, a background color of the badge, a color of a character in the badge, or a font of a character in the badge according to the acquired feature information, and
wherein when an application corresponding to the icon is an application folder, the processor is further configured to perform at least one of:
acquiring all image files of all application icons in the application folder, and using a most frequently appearing color value among color values of all pixels in all the image files as the feature color of the icon, or
acquiring all image files of all application icons in the application folder; and averaging color values of pixels with similar colors among all pixels in the image files, and using the averaged value as the feature color of the icon.

9. The device according to claim 8, wherein the processor is further configured to:
acquire an application type corresponding to the icon; and
determine the display element corresponding to the acquired application type according to a preset corresponding relationship between the acquired application type and the display element.

10. The device according to claim 8, wherein the processor is further configured to:
acquire the priority level of an application corresponding to the icon; and
determine a display element corresponding to the acquired priority level of the application according to a preset corresponding relationship between the acquired priority level of the application and the display element.

11. The device according to claim 8, wherein the processor is further configured to:
use the feature color as the background color of the badge, and/or as the color of the character in the badge.

12. The device according to claim 8, wherein the processor is further configured to perform at least one of:

acquiring a most frequently appearing color value among color values of all pixels in an image file of the icon, and using the acquired color as the feature color of the icon; or averaging color values of pixels with similar colors among all pixels in an image file of the icon, and using the averaged value as the feature color of the icon.

13. The device according to claim 8, wherein the processor is further configured to:

generate and display a badge border for the badge.

14. A non-transitory computer-readable storage medium having stored therein instructions that, when executed by a processor in a terminal device, cause the terminal device to perform a method for displaying a badge of an icon, the method comprising:

acquiring feature information of the icon, the feature information including at least a feature color of the icon;

determining a display element of the badge according to the acquired feature information, the determining of the display element of the badge comprises:

determining at least one of a shape of the badge, a background color of the badge, a color of a character in the badge, or a font of a character in the badge according to the acquired feature information; and generating and displaying the badge, according to the determined display element, at a preset position of the icon, wherein when an application corresponding to the icon is an application folder, acquiring the feature information of the icon comprises at least one of:

acquiring all image files of all application icons in the application folder, and using a most frequently appearing color value among color values of all pixels in all the image files as the feature color of the icon, or acquiring all image files of all application icons in the application folder; and averaging color values of pixels with similar colors among all pixels in the image files, and using the averaged value as the feature color of the icon.

* * * * *